Patented Mar. 29, 1927.

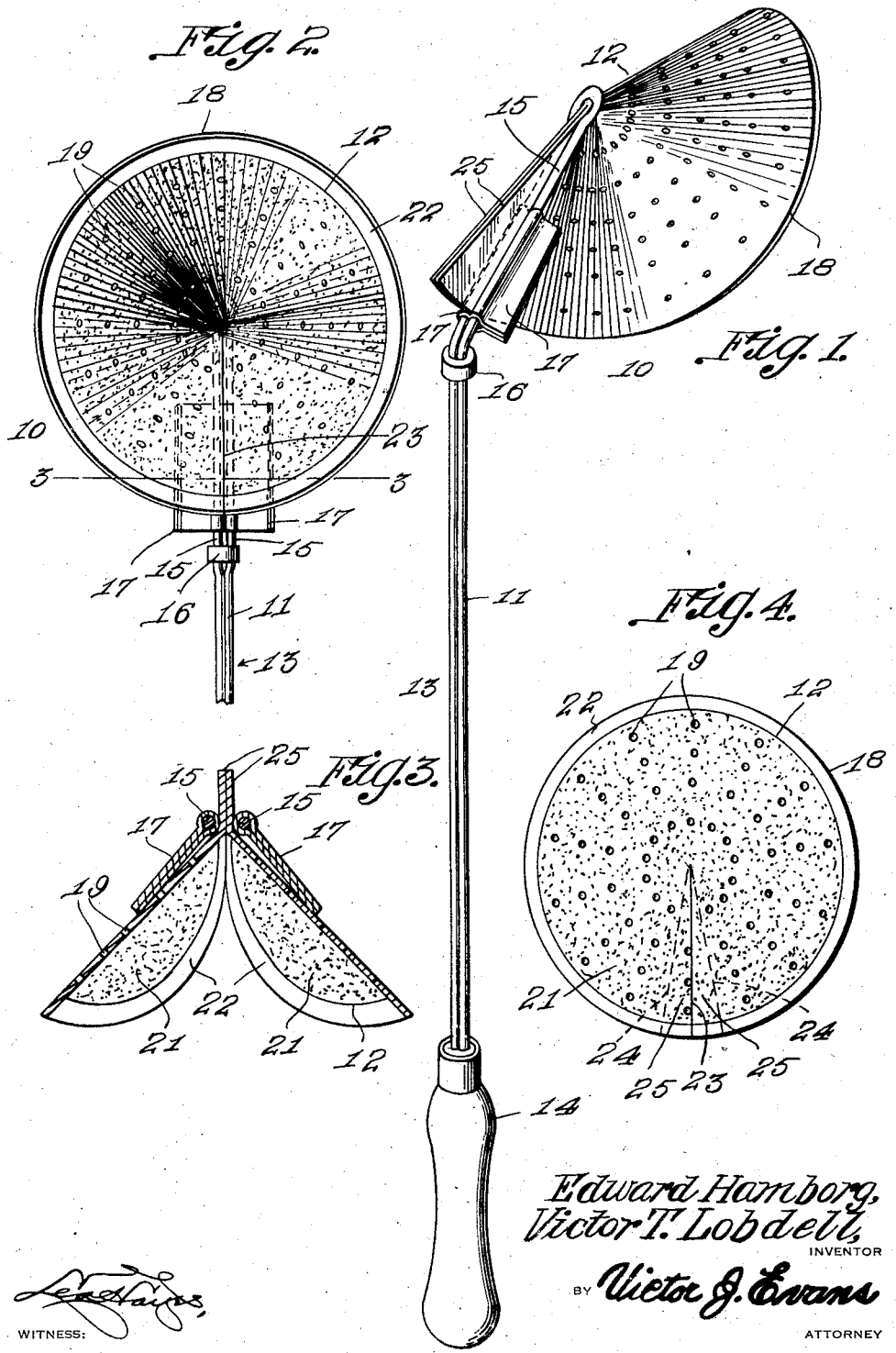

1,623,006

UNITED STATES PATENT OFFICE.

EDWARD HAMBORG, OF LINDEN, AND VICTOR T. LOBDELL, OF ELIZABETH, NEW JERSEY.

FLY CATCHER.

Application filed October 9, 1926. Serial No. 140,603.

This invention relates to improvements in fly catchers.

The primary object of the invention resides in a fly catcher adapted to be held in the hand of an operator and wielded through the air to catch flies in flight, whereby any fly coming in contact with the device is sure to be caught.

Another object of the invention resides in a fly catcher resembling in appearance the common fly swatter but which is unlike the swatter as the same does not leave a spot or mark on the wall or elsewhere when placed thereagainst to catch flies which may be resting thereon, and it eliminates the necessity of collecting dead flies, as the flies are caught and retained by the device.

A further object of the invention is the provision of a fly catcher which includes a holder for detachably receiving a cone shaped disk having its inner walls provided with a sticky substance such as that now used on fly paper, and on which disk the flies are caught. As the disk collects the flies, the same may be removed from the holder and discarded and a new disk substituted therefor.

A still further object of the invention is to construct a fly catcher which is simple in construction, inexpensive of manufacture and efficient for the purpose intended.

With these and other objects in view, the invention resides in the novel construction and combination and arrangement of parts, the essential features of which are hereinafter fully described, are particularly pointed out in the appended claims, and are illustrated in the accompanying drawing, in which:—

Figure 1 is a perspective view of our improved fly catcher looking toward the rear thereof.

Figure 2 is a front elevational view of the same.

Figure 3 is a horizontal sectional view on the line 3—3 of Figure 2.

Figure 4 is a plan view of the catching element prior to being folded into a cone shape.

Referring more particularly to the drawing, the reference numeral 10 designates our improved fly catcher in its entirety and which includes a holder element 11, and a removable fly catcher element 12.

The holder element 11 comprises a single piece of relatively stiff wire bent upon itself to provide parallel legs which co-act to form a staff 13. The free ends of the wire may be bent to form a handle or may be embedded in a hand grip 14 as shown in the drawing. The top end of the shaft is bent at an angle with respect to the axis of the handle and the parallel portions of the bent end serve as yieldable co-acting clamping jaws 15. The clamping jaws normally tend to expand but are held in a clamping position by a collar or ring 16 slidably mounted on the staff 13 and adapted to wedgingly engage the staff. Braces 17 are swingingly mounted on the jaws 15 for a purpose to be presently explained.

The catcher element 12 comprises a normally flat cardboard disk 18 having perforations 19 therein to reduce the air resistance when the device is wielded through the air. The front face of the disk is provided with a sticky substance 21 such as now used on fly paper but which substance terminates short of the peripheral edge of the disk to leave a clean edge 22 therearound. The disk is cut on the radial line 23 and then folded backward on the radial lines 24 disposed on opposite sides of the cut. The flaps 25 caused by the folding on the lines 24 are brought flat against each other which transforms the flat disk into a cone shaped disk. The flaps 25 are inserted between the clamping jaws 15 of the holder and clamped therein by reason of the wedging engagement of the collar 16. The braces 17 are swung against the back of the cone disk to reinforce the same and for preventing the jaws from tearing the disk.

In practice, the hand grip 14 is grasped by the hand of the operator and the device waved or wielded through the air within the path of the fly to be caught, it of course, being the object to cause the fly to come in contact with the inner sticky walls of the disk. Once the disk comes in contact with the fly it is held captive and soon dies. Should it be desired to catch a fly on a flat surface such as a wall, the disk is placed over the fly and in trying to escape the fly will come in contact with the sticky substance and be caught. No marks will be left on the wall such as those caused by swatting the fly nor does the sticky substance on the disk come in contact with the walls, as the peripheral edge of the cone disk is left clean. The device may be used in instances where an ordinary fly swatter would fail, such as to catch flies on a line or wire. It will be appreciated that the flies killed do not have to be collected as they remain on the disk, which when full, may be disposed of and a fresh disk placed in the holder.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. A fly catcher comprising a staff having a handle on one end thereof, normally expanding clamping jaws on the other end of said staff, a conical shaped disk having a sticky substance on the front face thereof, flanges extending from the rear of said disk and seated between said jaws, and means for holding said jaws compressed against said flanges.

2. A fly catcher comprising a holder element, a conical shaped member having a sticky substance on the concave surface thereof, said conical shaped member formed from a single flat piece of relatively stiff bendable material cut and folded backward to form a pair of meeting flaps, and clamping means on said holder for receiving said flaps for holding said disk in conical shape.

3. In a fly catcher, a disk formed of a single flat piece of relatively stiff bendable material, a sticky substance on one of the faces of said disk and terminating short of the peripheral edges thereof, said disk being cut inwardly from its peripheral edge and folded backward to provide a pair of meeting flaps, a holder element, and means on said holder element for gripping said flaps for holding said disk in cone formation.

4. A fly catcher comprising a holder, a conical shaped perforated member having a sticky substance on the interior walls thereof, and tabs extending from the outer walls of said member, and clamping jaws provided on said holder for receiving and gripping said tabs for removably supporting said member thereon.

In testimony whereof we hereby affix our signatures.

EDWARD HAMBORG.
VICTOR T. LOBDELL.